July 14, 1959 P. G. ROTHE 2,895,111

FREQUENCY RESPONSE CURVE EQUALIZATION

Filed Oct. 17, 1957

Inventor:

Paul-Gerhard Rothe

By [signature] Patent Agent

United States Patent Office 2,895,111

Patented July 14, 1959

2,895,111

FREQUENCY RESPONSE CURVE EQUALIZATION

Paul G. Rothe, Ulm (Danube), Germany, assignor to Telefunken G.m.b.H., Berlin, Germany Application October 17, 1957, Serial No. 690,741

Claims priority, application Germany October 25, 1956

1 Claim. (Cl. 333—28)

The present invention relates to means for distortion correcting devices for the frequency response curve of a four-terminal network for signals of a wide frequency band width, such as, for example, television signals. Distortions occur, for example, in the transmission networks passing such signals, as for instance, during recording on films or magnetic tapes, whereby these distortions are primarily noticeable as amplitude attenuation at the higher frequencies. If the transfer factor is denoted by $A(\omega)$, it is the object to find a transfer factor $B(\omega)$ and to provide such a factor in a second four-terminal network that, within the frequency range $\omega_1 \ldots \omega_2$ to be transmitted, there is the relation:

$$A(\omega).B(\omega)=1$$

If a response curve without phase distortion is assumed for the four-terminal network to be equalized, as is true for aperture distortions, for example, the transfer factor $A(\omega)$ constitutes a real even function of $\omega$, i.e., $$A(-\omega)=A(\omega)$$

If it is further assumed that $A(\omega)$ is finite within the range from $\omega_1 \ldots \omega_2$ and is different from zero, and that $A(0)=1$, the transfer factor $B(\omega)$ of the second four-terminal network can be approximated as being $$(1) \qquad B(\omega)=\frac{1}{A(\omega)}=1+b_1\omega^2+b_2\omega^4+\ldots b_n\omega^{2n}$$

Thus, an equalization within the range $\omega_1 \ldots \omega_2$ can be carried out by adding to the signal multiples of its even derivatives designated by the factors $b_1$. If such addition were to be accomplished in a single adding stage, it would be difficult to correctly fix the individual coefficients $b_1$ of the various differentiating stages required for more exact equalization in case of a larger number $n$ of stages. Moreover, the shunting of such numerous individual stages would be difficult.

It is an object of the present invention to provide for the purpose of adding certain multiples of the even derivatives of the signal to be equalized a cascade circuit comprising several equalizing stages, designed in such a manner that in each of these equalizing stages either only the second or only the second and fourth derivatives with suitable amplitudes are added to the input signal. The adjusting of the individual differentiating stages is considerably facilitated by the fact that the cumulative effect of each equalization can be observed in the output signal of each individual stage.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

Figure 1:
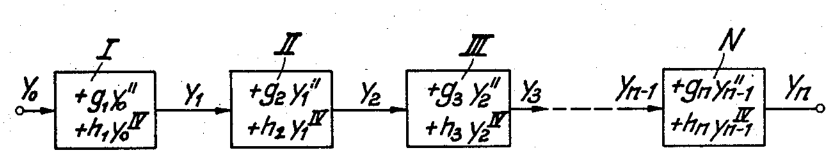
Figure 1 shows schematically as a block diagram a multiple-stage circuit arrangement for equalization according to the invention.

In the block diagram of Figure 1, a signal $y_0$ to be equalized is fed to a first equalizing stage I, where the second $y_0''$ and the fourth $y_0^{IV}$ derivative with the amplitudes $g_1$ and $h_1$ respectively are imposed upon the signal $y_0$. In this case, the amplitude factor $h_1$ for the fourth derivative may be zero, so that only the second derivative $y_0''$ is added to the original signal $y_0$.

In the same manner as the signal $y_0$ is treated in the first correcting stage I the output signal $y_1$ of said stage is treated in correcting stage II by adding to the signal $y_1$ its second derivative $y_1''$ and its fourth derivative $y_1^{IV}$ with the amplitudes $g_2$ and $h_2$, respectively, to obtain a signal $y_3$. The same operation is repeated in further equalizing stages III . . . etc., in accordance with the required equalization precision, until in the $n$th stage N, the derivatives $y''_{n-1}$ and $y^{IV}_{n-1}$ are added to the signals $y_{n-1}$ to obtain the output signal $y_n$. In this case, the factors $h_1, h_2 \ldots h_n$ may be zero, as will be shown below. The cumulative effect of the respectively obtained equalizations can be measured at the output of each of these equalization stages and the successive stage can then be designed in accordance with these measurements.

It will now be shown that with the use of such a cascade circuit system, two different kinds of equalization circuits are sufficient and that the same effect can be obtained in a simpler way than it can be obtained by using a great number of shunted differentiating stages for obtaining the even derivatives. For this purpose, $x=\omega^2$ will be used. Thus, the following equation is obtained:

$$(2) \qquad B(\omega)=1+b_1x+b_2x^2 \ldots b_nx^n$$

This function has either real or pairs of conjugate complex zeros. Moreover, the real zeros are negative, because positive zeros would result in infinite values of $A(\omega)$ which, it has been assumed, are not present. Thus, the zeros have either the form $$x_i=-\alpha_i^2$$

or $$x_{k1}=\alpha_k+j\beta_k$$
$$x_{k2}=\alpha_k-j\beta_k$$

wherein $\alpha_i$, $\alpha_k$ and $\beta_k$ are real. The following equations are obtained therefrom:

(3)

$$B(\omega)=1+b_1\omega^2+b_2\omega^4+\cdots+b_n\omega^{2n}=$$
$$A.\pi(\omega^2+\alpha_i^2)\cdot\pi(\omega^2-\alpha_k-j\beta_k)\cdot(\omega^2-\alpha_k+j\beta_k)=$$
$$A.\pi(\omega^2+\alpha_i^2)\cdot\pi(\omega^4-2\alpha_k\omega^2+\alpha_k^2+\beta_k^2)=$$
$$\pi\left(1+\frac{\omega^2}{\alpha_i^2}\right)\cdot\pi\left(1-\frac{2\alpha_k}{\alpha_k^2+\beta_k^2}\omega^2+\frac{1}{\alpha_k^2+\beta_k^2}\omega^4\right)$$

Since the product of all of the absolute terms shall be one, the coefficient A does not appear in the last line of this equation. Thus, the equalization of the transfer factor $A(\omega)$ can always be obtained by means of a cascade circuit comprising stages of a first type which insert only the second derivative in the signal corresponding to the terms of the first product, and by stages of a second type, inserting the second and fourth derivatives in the signal corresponding to the terms of the second product.

Figure 2:
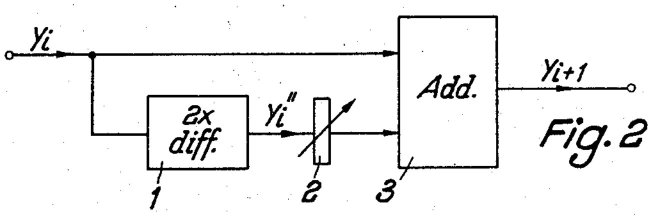
Figure 2 is a block diagram showing a first embodiment of one of said stages.

In the block diagram of Figure 2, illustrating the circuit of a stage of the first type, the second derivative is obtained from a signal $y_i (i=0, 1, 2, \ldots)$ by means of a circuit 1 differentiating twice, and is supplied to the adding stage 3 via an amplitude control member 2. The second derivative $y_i''$ is here added to the signal $y_i$. The output signal $y_{i+1}$ is fed to further equalizing stages either of the first or the second type.

Figure 3:
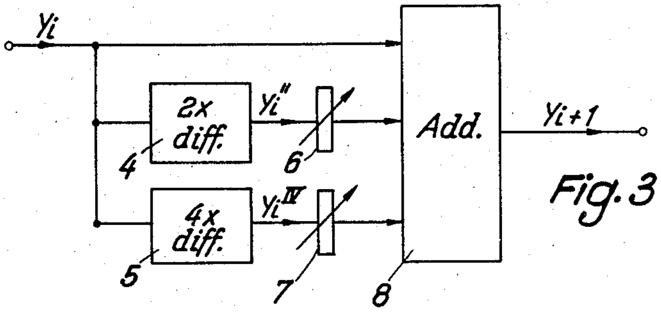
Figures 3 and 4 show further modified embodiments of one of said stages.

Figure 3 shows an equalizing stage of the second type in which the signal $y_i$ is fed to a twice-differentiating stage 4 and to a stage 5 which differentiates four times. The outputs of these stages are supplied to an adding stage 8 via amplitude control members 6 and 7, respectively.

Figure 4:
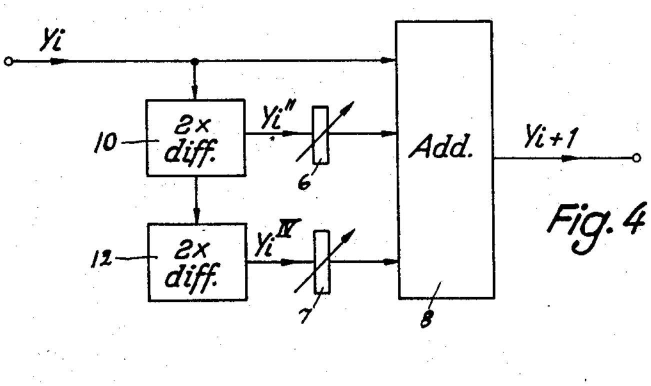

In the embodiment of Figure 4, a stage of the second type is schematically shown. In contrast to the embodiment of Figure 3, the fourth derivative of the input signal $y_i$ is formed in a twice-differentiating stage 12 by repeated double differentiation of the second derivative obtained from a differentiating circuit 10. The remaining reference characters in Figure 4 are the same as those in Figure 3. Circuits known per se may be used for the differentiation operation in the individual stages and, therefore, details of these differentiation circuits do not have to be illustrated.

I claim:

A circuit arrangement for equalizing the frequency response curve of a four-terminal network passing a signal covering a wide frequency band, comprising a plurality of successive stages each receiving an input signal and delivering an output signal and said stages being connected in cascade with said network; differentiating means in each stage for forming at least one of the second and the fourth derivatives of the input signal; summing means in each stage for adding together a component of the input signal and said derivatives to form an output signal; and amplitude adjusting means for determining the amplitudes of the derivatives being added.

References Cited in the file of this patent

UNITED STATES PATENTS 2,304,740 Minton ---------------- Dec. 8, 1942